United States Patent
Shirilla

(10) Patent No.: US 9,482,393 B2
(45) Date of Patent: Nov. 1, 2016

(54) FLEXIBLE LIGHT PANEL FOR PROFESSIONAL USE

(71) Applicant: John E. Shirilla, Davidson, NC (US)

(72) Inventor: John E. Shirilla, Davidson, NC (US)

( * ) Notice: Subject to any disclaimer, the term of this patent is extended or adjusted under 35 U.S.C. 154(b) by 0 days.

(21) Appl. No.: 14/948,375

(22) Filed: Nov. 22, 2015

(65) Prior Publication Data
US 2016/0076708 A1    Mar. 17, 2016

Related U.S. Application Data

(63) Continuation-in-part of application No. 13/912,751, filed on Jun. 7, 2013.

(51) Int. Cl.
| | |
|---|---|
| F21K 99/00 | (2016.01) |
| F21V 21/14 | (2006.01) |
| F21V 23/00 | (2015.01) |
| F21S 2/00 | (2016.01) |
| F21V 21/005 | (2006.01) |
| G03B 15/02 | (2006.01) |
| G03B 15/07 | (2006.01) |
| F21Y 105/00 | (2016.01) |
| F21Y 103/00 | (2016.01) |

(52) U.S. Cl.
CPC . *F21K 9/30* (2013.01); *F21K 9/90* (2013.01); *F21S 2/005* (2013.01); *F21S 4/24* (2016.01); *F21V 21/005* (2013.01); *F21V 21/14* (2013.01); *F21V 21/145* (2013.01); *F21V 23/002* (2013.01); *G03B 15/02* (2013.01); *G03B 15/07* (2013.01); *F21Y 2103/003* (2013.01); *F21Y 2105/001* (2013.01); *G03B 2215/0514* (2013.01); *G03B 2215/0517* (2013.01)

(58) Field of Classification Search
None
See application file for complete search history.

(56) References Cited

U.S. PATENT DOCUMENTS

| | | | | |
|---|---|---|---|---|
| 3,894,225 A | * | 7/1975 | Chao | G09F 13/28 174/117 A |
| 4,173,035 A | * | 10/1979 | Hoyt | F21S 10/00 361/749 |

(Continued)

FOREIGN PATENT DOCUMENTS

| | | | |
|---|---|---|---|
| WO | 02061328 | | 8/2002 |
| WO | WO02061328 | * | 8/2002 |
| WO | 2014145416 | | 9/2014 |

OTHER PUBLICATIONS

International Search Report and Written Opinion for International Application No. PCT/US2014/037087 "Flexible Panel", Sep. 25, 2014.*

(Continued)

*Primary Examiner* — Ashok Patel
(74) *Attorney, Agent, or Firm* — Emerson Thomson Bennett, LLC

(57) ABSTRACT

A professional grade lighting apparatus may include a base panel that is flexible and has a reflector surface and a holding panel that is flexible and formed of a transparent and/or translucent material. A plurality of commercially available LED strips may be placed within pockets. The base panel may be fixed to the holding panel at a plurality of attachment locations that define hinges permitting relative pivotal motion.

20 Claims, 17 Drawing Sheets

(56) References Cited

U.S. PATENT DOCUMENTS

| | | | |
|---|---|---|---|
| 4,439,818 A | 3/1984 | Scheib | |
| 4,607,317 A | 8/1986 | Lin | |
| 4,782,336 A * | 11/1988 | Bailey | G09G 3/001 345/204 |
| 4,970,812 A * | 11/1990 | Tanaka | G09F 9/33 40/444 |
| 5,057,981 A | 10/1991 | Bowen et al. | |
| 5,162,696 A | 11/1992 | Goodrich | |
| 5,469,020 A * | 11/1995 | Herrick | G02F 1/1365 257/E25.02 |
| 5,532,711 A * | 7/1996 | Harris | G02B 6/0008 340/815.42 |
| 5,697,175 A | 12/1997 | Schwartz | |
| 5,964,518 A | 10/1999 | Shen | |
| 6,158,882 A | 12/2000 | Bischoff, Jr. | |
| 6,193,385 B1 | 2/2001 | Maki et al. | |
| 6,311,350 B1 | 11/2001 | Kaiserman et al. | |
| 6,331,915 B1 * | 12/2001 | Myers | G09F 9/33 359/599 |
| 6,352,355 B1 | 3/2002 | Law | D04D 9/04 362/234 |
| 6,394,623 B1 * | 5/2002 | Tsui | F21S 4/26 362/235 |
| 6,513,955 B1 | 2/2003 | Waltz | |
| 6,677,918 B2 * | 1/2004 | Yuhara | G09F 9/33 345/1.3 |
| 6,787,990 B2 | 9/2004 | Cok | |
| 6,808,295 B2 | 10/2004 | Waltz et al. | |
| 6,871,981 B2 | 3/2005 | Alexanderson et al. | |
| D509,954 S | 9/2005 | Waltz | |
| 7,075,226 B2 | 7/2006 | Cok | |
| 7,246,925 B2 | 7/2007 | Waltz et al. | |
| 7,319,408 B2 * | 1/2008 | Temple | G09F 9/33 340/815.45 |
| 7,354,180 B2 * | 4/2008 | Sawhney | G09F 9/33 362/238 |
| 7,374,315 B2 * | 5/2008 | Dorsey | F21S 48/215 362/249.01 |
| 7,604,377 B2 * | 10/2009 | Yu | H05K 1/0274 362/249.02 |
| 8,172,426 B2 * | 5/2012 | Frey | G02F 1/133305 362/217.16 |
| 8,384,295 B2 | 2/2013 | Simi | |
| 8,410,726 B2 | 4/2013 | Dau et al. | |
| 8,599,104 B2 * | 12/2013 | Gardner | F21S 2/005 345/1.1 |
| 8,690,385 B2 * | 4/2014 | Ubaghs | F21V 33/0008 362/103 |
| 8,851,356 B1 * | 10/2014 | Holec | H01R 4/02 228/103 |
| 2002/0187697 A1 * | 12/2002 | Kiryuschev | D03D 15/00 442/181 |
| 2004/0160768 A1 * | 8/2004 | Cok | F21K 9/135 362/647 |
| 2006/0007059 A1 * | 1/2006 | Bell | A41D 27/085 345/55 |
| 2006/0007666 A1 | 1/2006 | Cook | |
| 2006/0082987 A1 * | 4/2006 | Dorsey | F21S 48/215 362/103 |
| 2006/0215398 A1 * | 9/2006 | Farmer | F21S 4/10 362/227 |
| 2007/0182666 A1 * | 8/2007 | Hochman | G09F 19/22 345/46 |
| 2007/0217200 A1 * | 9/2007 | Yang | H05K 1/0203 362/277 |
| 2008/0089060 A1 * | 4/2008 | Kondo | F21V 17/107 362/231 |
| 2009/0059610 A1 * | 3/2009 | Marshall | B60Q 3/0203 362/470 |
| 2009/0146910 A1 * | 6/2009 | Gardner | F21S 2/005 345/1.3 |
| 2009/0231834 A1 | 9/2009 | Krohn | |
| 2010/0008090 A1 * | 1/2010 | Li | F21V 17/007 362/249.03 |
| 2010/0103649 A1 * | 4/2010 | Hamada | H01R 23/667 362/97.1 |
| 2011/0096531 A1 * | 4/2011 | Frey | G02F 1/133305 362/97.4 |
| 2011/0163681 A1 * | 7/2011 | Dau | F21K 9/135 315/191 |
| 2011/0227487 A1 | 9/2011 | Nichol et al. | |
| 2014/0254152 A1 | 9/2014 | Bohler | |
| 2014/0268777 A1 | 9/2014 | Saydkhuzhin et al. | |

OTHER PUBLICATIONS http://www.fjwestcott.com/lighting/flex; Westcott website printout showing Flex Lights.
http://aladdin-lights.com/flex-lite; Aladdin website printout showing Flexlite 2.
http://petapixel.com/2014/05/25/raglite-looks-to-kickstart-the-worlds-first-flexible-led-lightbank; clip taken from website around Jul. 2015.
http://www.theraglite.com/#design-philosophy; Raglite website printout showing Raglight; clip taken from website around Jul. 2015.
http://aladdin-ams.com/?ckattempt=1; Aladdin website printout showing different lights; clip taken from website around Jul. 2015.
https://www.youtube.com/watch?v=z232OOUNJMY; video of 5050 Waterproof Flexible LED Light Strip Review for Undercabinet Lighting, uploaded 2011; clip taken from video around Jul. 2015.
https://www.facebook.com/pages/Aladdin-Lights/669986983067597?sk=timeline&ref=page_internal.
Picture of Raglite taken around Jul. 2015.
Sample photo taken from Westcott Flex website around Jul. 2015.

* cited by examiner

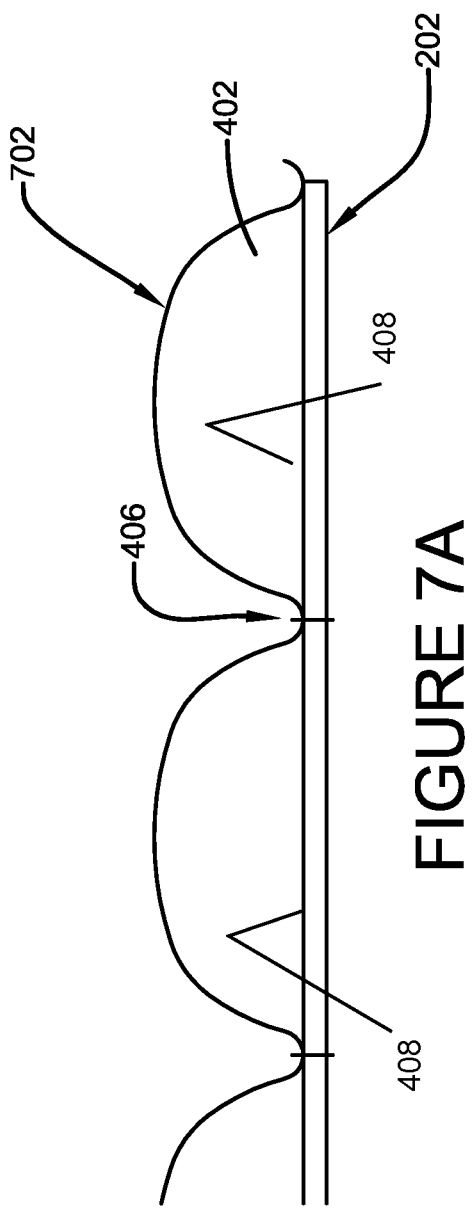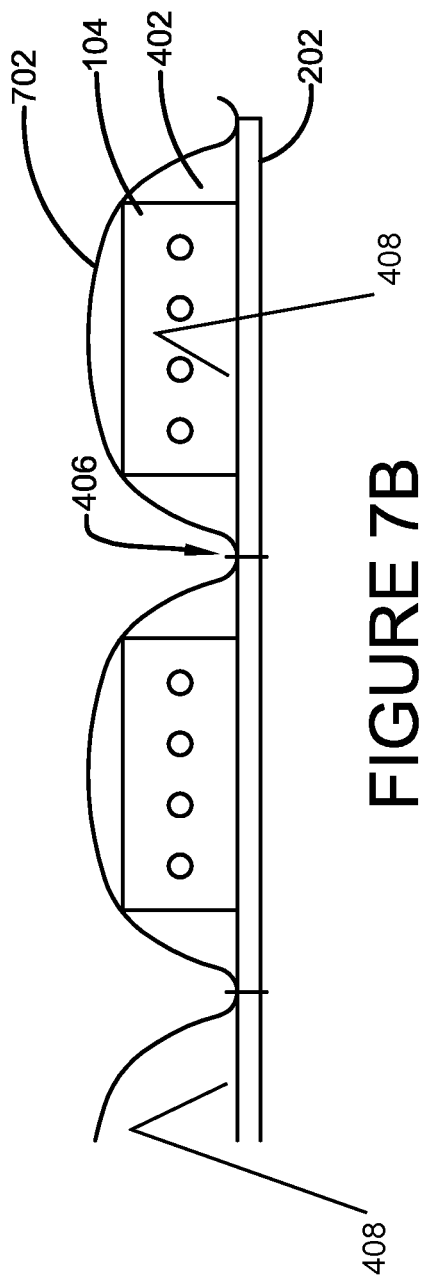

FLEXIBLE LIGHT PANEL FOR PROFESSIONAL USE

This application is a continuation-in-part application of U.S. patent application Ser. No. 13/912,751 filed Jun. 7, 2013, entitled FLEXIBLE LIGHT PANEL, the contents of which are incorporated herein by reference.

BACKGROUND

Professional photographers, film makers, and the like, require a professional grade light source, whether for capturing scenery, live action, portraits, nature, etc., both indoors or outdoors. Further, various types of illumination effects may be desired used for live performances, such as on a stage. Lighting systems are typically used to illuminate a subject to provide a desired effect during image capture. Lighting can also be used to obtain a desired illumination effect, for example, by using lighting having a particular tone, warmth, or intensity. Further, certain lights may be used for particular purpose, for example, where the type of light emitted may be used for the specific purpose, such as anti-microbial treatment using ultra-violet lights, and/or general lighting of an area.

Current and prior lighting systems include incandescent or fluorescent lighting elements. However, these systems have limitations limiting their flexibility or effectiveness. As an example, mounting frames used these types of lighting systems are typically large and onerous, making them difficult to move, store and use. Incandescent lighting can generate large amounts of heat, which can causing discomfort to, or alter the properties of, the subject of the image; and/or may alter the image due to heat waves appearing in the image. Additionally, incandescent systems tend to draw a lot of electrical power, thereby resulting in larger generation or supply needs. Further, specific purpose lights are typically limited by a frame or mounting system used to hold and/or aim the lighting emitting devices. A Light Emitting Diode (LED) is a known light source. Rarely, however, are LEDs used in a manner sufficient to serve as a professional grade lighting apparatus. Even those few that do, can be improved upon and made easier to use.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a professional grade lighting apparatus using commercially available LED strips may be configured to be easily portable, configurable, modular, and efficient, and may provide the desired type of illumination, for example, during image capture and/or other purpose specific light-provision. A plurality of LED strips may be arranged on a flexible panel. The LED strips can be electrically coupled to a power supply line, which may be connected to an electrical supply (e.g., outlet). The flexible nature of the exemplary lighting system may allow it to be easily stowed, for example, by rolling the panel in a roll and selectively securing the roll configuration, such as using a fastener. Further, the exemplary lighting system may comprise attachment means for selectively attaching the flexible panel to a light holder system, such as for use during lighting use for image capture.

According to some implementations of this invention, a professional grade lighting apparatus may be used with an associated electrical supply. The professional grade lighting apparatus may comprise: a base panel that is flexible and comprises a reflector surface; a holding panel that is flexible and formed of a transparent and/or translucent material; a plurality of commercially available LED strips each comprising: (1) first and second opposite ends; (2) electrical circuitry; (3) electric wiring that extends from each end; (4) a first side from which LED light is emitted; and, (5) a second side opposite the first side; and, an electric supply connector that electrically connects to the associated electrical supply and to the electric wiring of the LED strips. The base panel may be fixed to the holding panel at a plurality of attachment locations that define hinges permitting relative pivotal motion. The pockets are defined as spaces that are: (1) between juxtaposed attachment locations; and, (2) between the base panel and the holding panel. Each pocket has opposite open ends. Each LED strip is positioned within a pocket with: (1) the electric wiring at each end accessible through the corresponding pocket open end; (2) the first side in physical contact with the holding panel; and, (3) the second side in physical contact with the reflector surface of the base panel. The electric wiring at the first ends of the LED strips are electrically interconnected and the electric wiring at the second ends of the LED strips are electrically interconnected. The electric supply connector supplies power from the associated electrical supply to illuminate the LED strips within the pockets to emit the LED light through the holding panel at sufficient lumens for use as a professional grade photographic lighting panel. Each LED strip is designed to be selectively independently removable from its electric wiring and from at least one of its corresponding pocket open ends. Juxtaposed pockets, and thus juxtaposed LED strips, are pivotal relative to each other about their neighboring hinge. The professional grade lighting apparatus is designed to be adjusted between: (1) a first configuration comprising a rolled-up panel configuration; and, (2) a second configuration comprising a flat configuration.

According to other implementations of this invention, a method of assembling a professional grade lighting apparatus that can be used with an associated electrical supply may include the steps of: (A) providing a base panel that is flexible and comprises a reflector surface; (B) providing a holding panel that is flexible and formed of a transparent and/or translucent material; (C) providing a plurality of commercially available LED strips each comprising: (1) first and second opposite ends; (2) electrical circuitry; (3) electric wiring that extends from each end; (4) a first side from which LED light is emitted; and, (5) a second side opposite the first side; (D) providing an electric supply connector; (E) fixing the base panel to the holding panel at a plurality of attachment locations that define hinges permitting relative pivotal motion; (F) defining pockets as spaces that: (1) are between juxtaposed attachment locations; (2) are between the base panel and the holding panel; and, (3) have opposite open ends; (G) positioning each LED strip within a pocket with: (1) the electric wiring at each end accessible through the corresponding pocket open end; (2) the first side in physical contact with the holding panel; (3) the second side in physical contact with the reflector surface of the base panel; (4) the electric wiring at the first ends of the LED strips electrically interconnected; and, (5) the electric wiring at the second ends of the LED strips electrically interconnected. The professional grade lighting apparatus may be designed, when assembled, to perform the following steps: (H) electrically connecting the electric supply connector to the associated electrical supply and to the electric wiring of the LED strips to power the LED strips to provide professional grade photographic lighting; (I) selectively independently removing each LED strip from its electric wiring and from at least one of its corresponding pocket open end; (J) pivoting juxtaposed pockets, and thus juxtaposed LED strips, relative to each other about their neighboring hinge; and, (K) adjusting the professional grade lighting apparatus between: (1) a first configuration comprising a rolled-up panel configuration; and, (2) a second configuration comprising a flat configuration.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 7A and 7B are component diagrams illustrating an example implementation of one or more portions of an exemplary lighting panel.

DETAILED DESCRIPTION

Figure 1A:
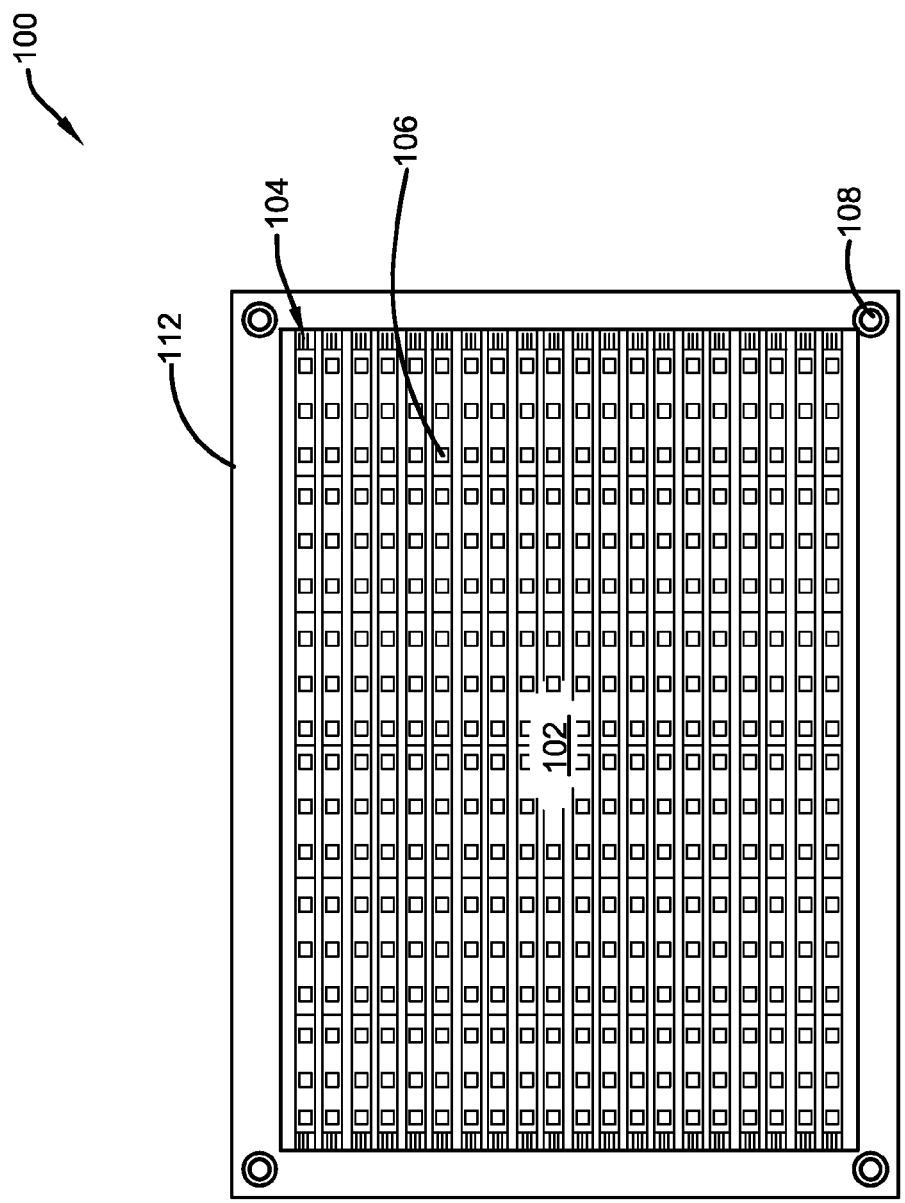
FIGS. 1A and 1B are component diagrams illustrating an exemplary lighting panel.
Figure 1B:
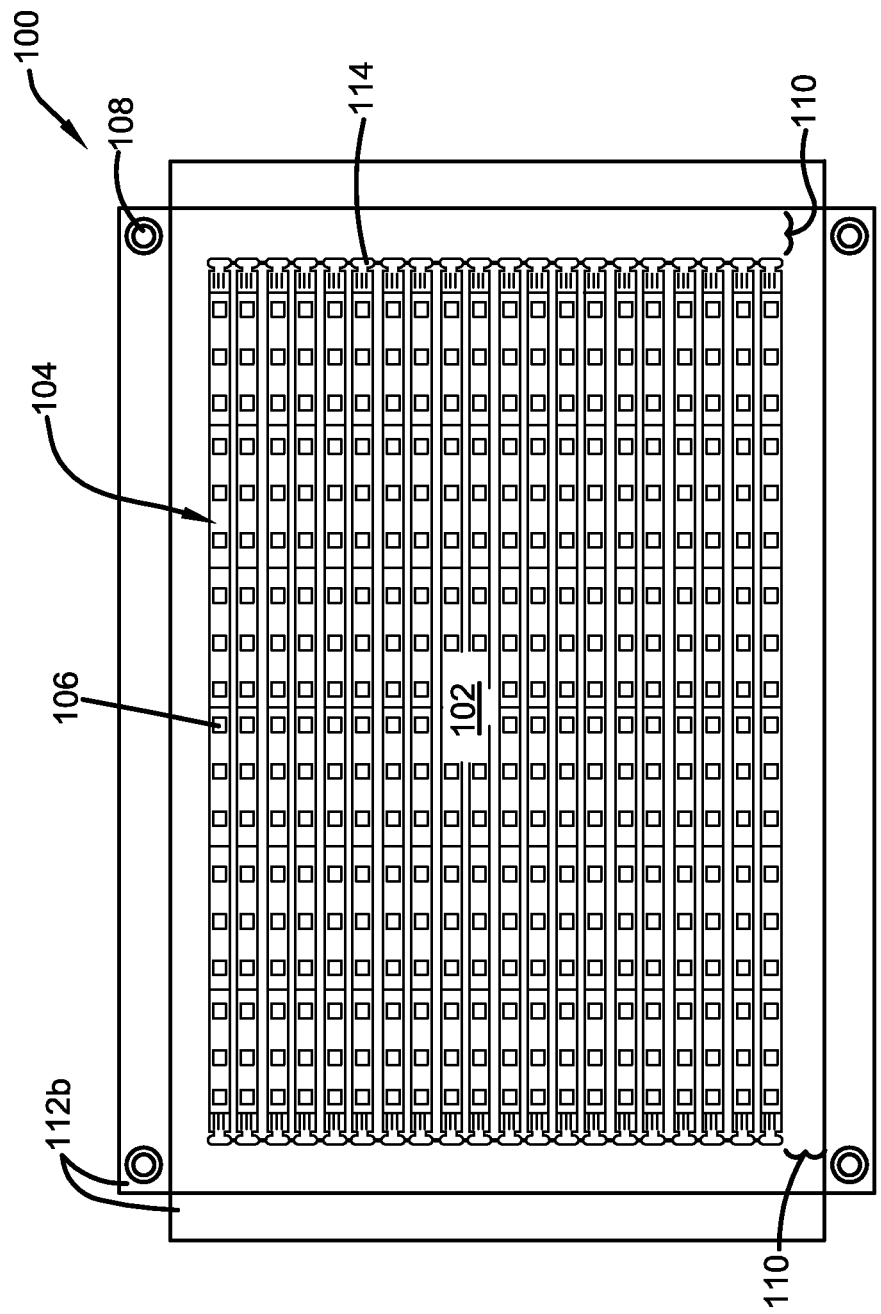
Figure 2:
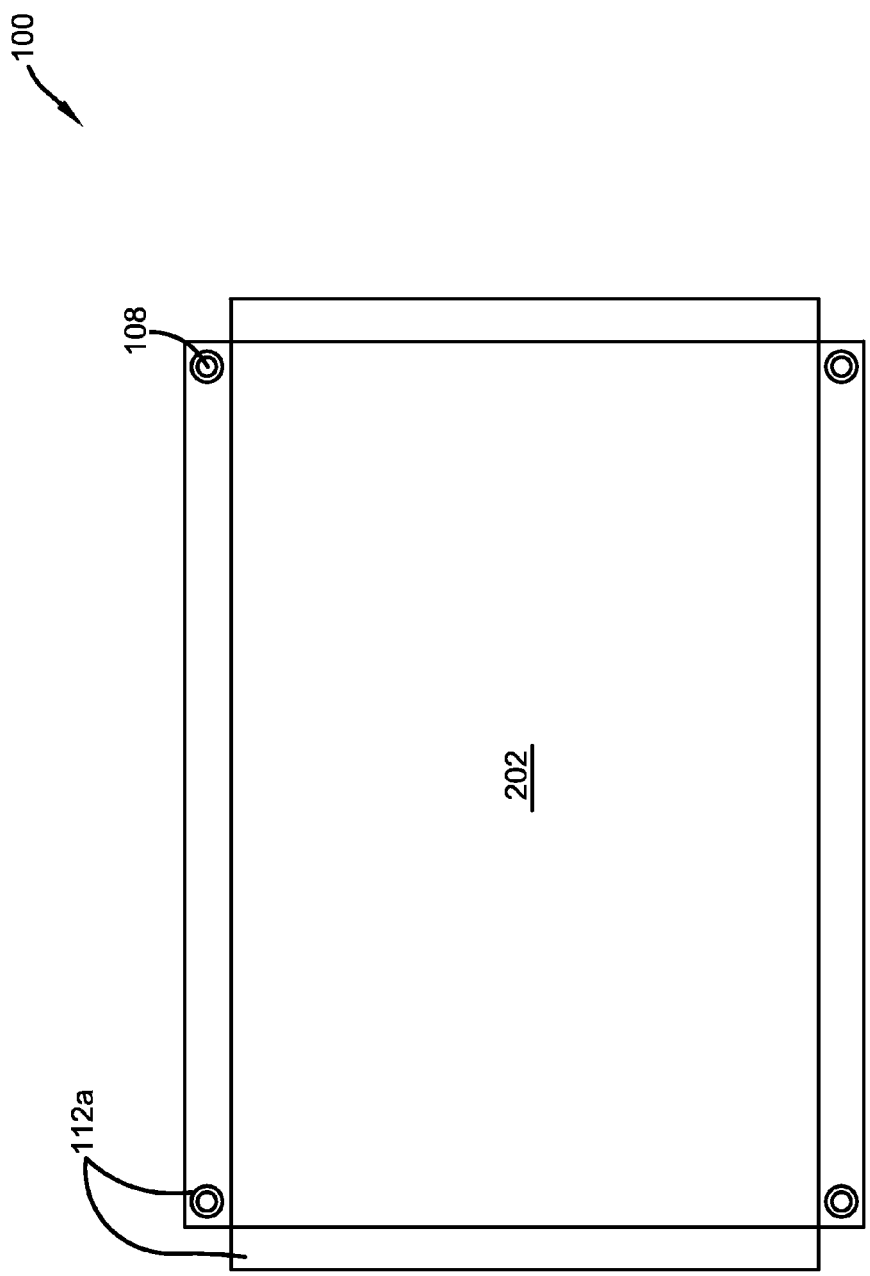
FIG. 2 is a component diagram illustrating a rear view of an example implementation of one or more portions of an exemplary lighting panel.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A professional grade lighting apparatus using commercially available LED strips may be devised that may be relatively light-weight, readily portable, easy to work with, modular, and efficient, and, for example, may provide appropriate illumination during image capture, such as photography, videography, and/or stage lighting. A flexible panel may comprise a plurality of commercially available LED strips which may be arranged on the flexible panel in a manner that allows the lighting system to be easily compacted, and secured in the compact configuration for stowing and/or transportation. Further, the lighting system may be expanded for use, and may also comprise attachment means for selectively attaching the flexible panel to a light holding device. Further, the lighting panel may comprise any suitable configuration, shape and/or size, suited for a particular purpose, set-up, and/or location.

Figure 12A:
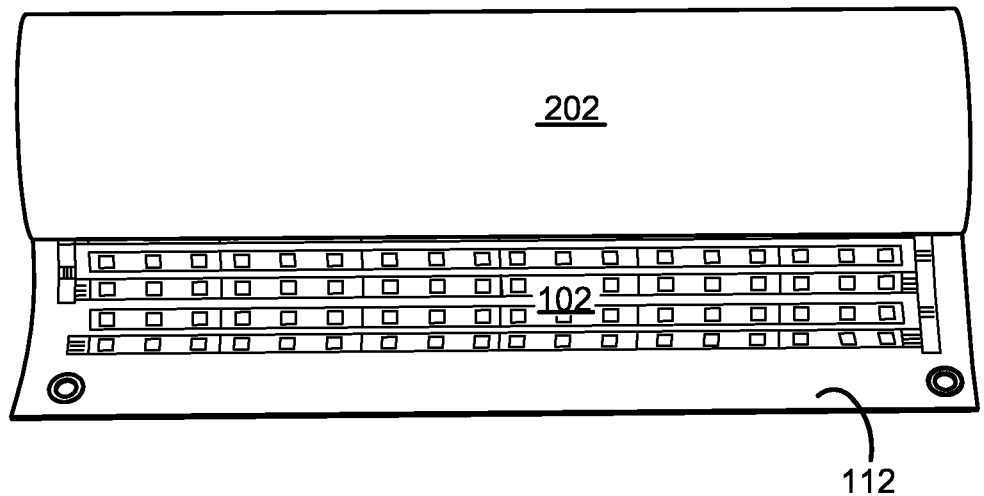
FIGS. 12A and 12B are component diagrams illustrating an example implementation of one or more portions of an exemplary lighting panel.
Figure 12B:
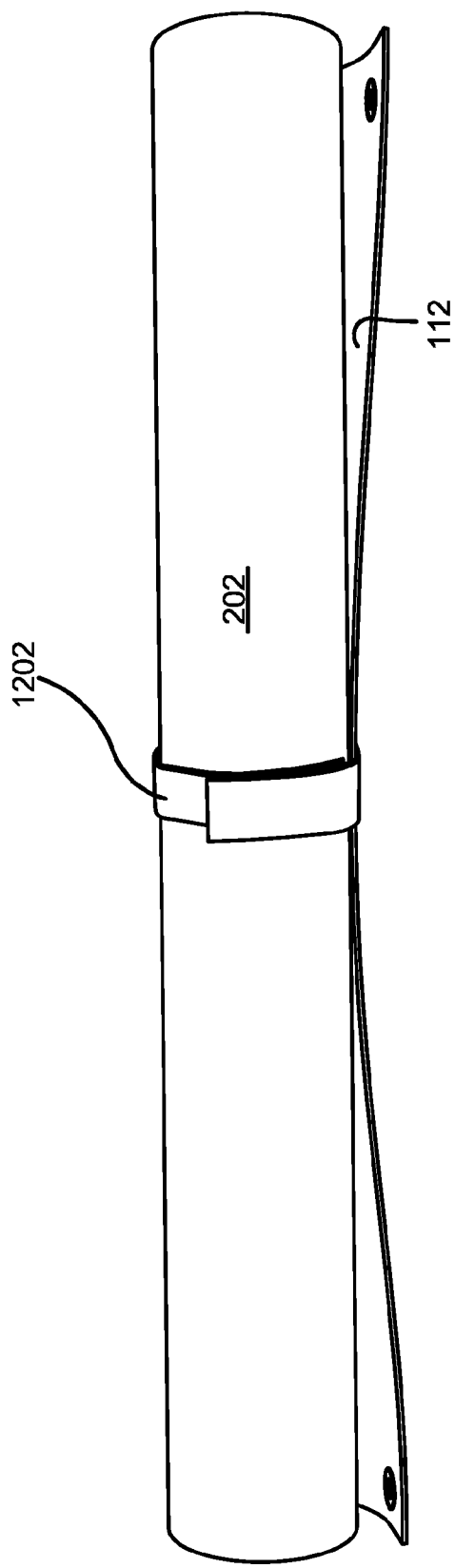
Figure 13A:
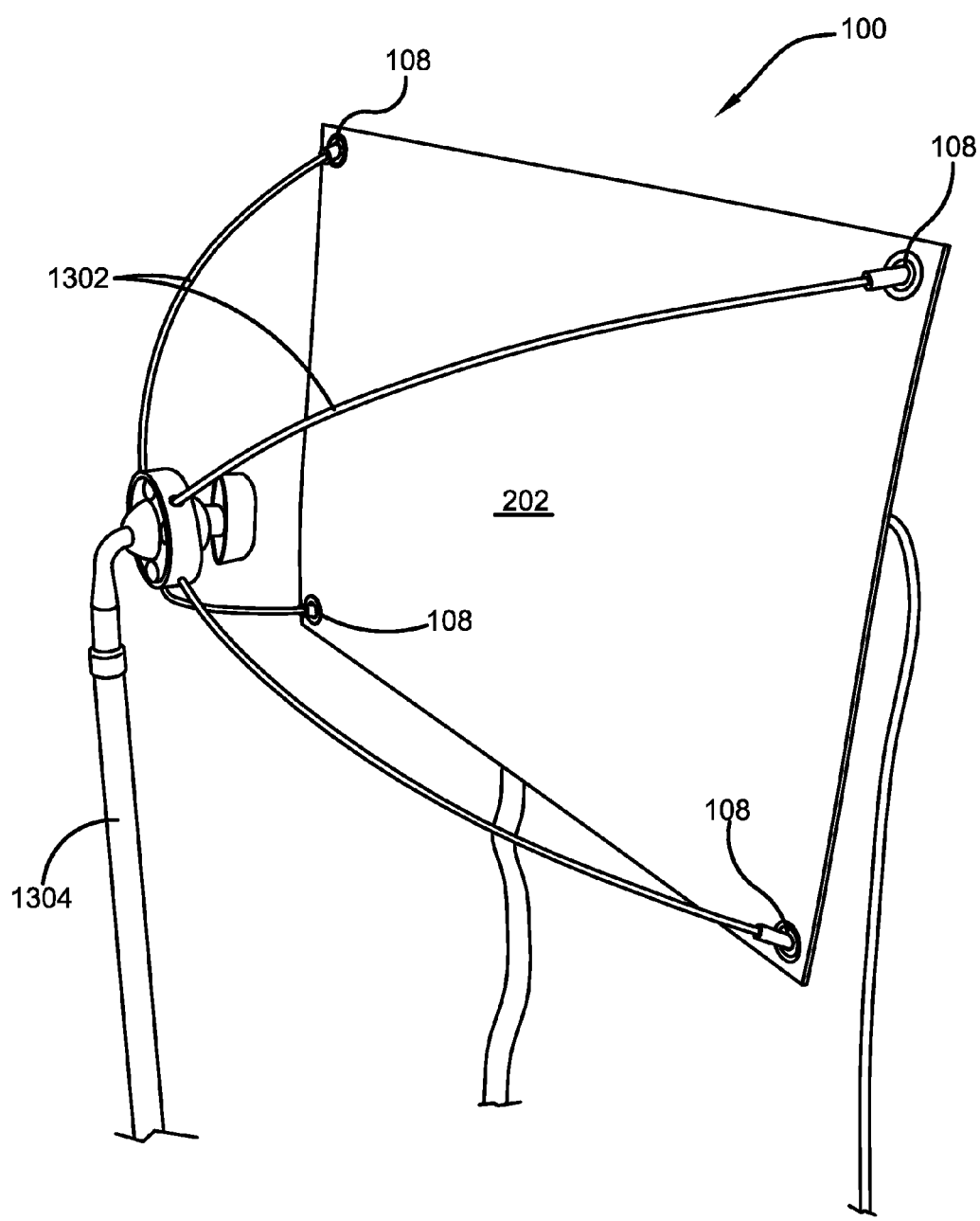
FIGS. 13A and 13B are component diagrams illustrating example implementations of one or more portions of an exemplary lighting panel.

Now with reference to FIGS. 1A, 1B, 2-4 and 7, which illustrate one or more portions of an exemplary professional grade lighting apparatus 100, as described herein. Professional grade lighting apparatus 100 comprises a base panel 202 that comprises a flexible material. The base panel 202 may have a reflector surface 408 formed of a reflector material chosen with the sound judgment of a person of skill in the art. This increases the total light emitted by the professional grade lighting apparatus 100. The base panel 202 may be manipulated into a first configuration, comprising a compact arrangement, and a second configuration, comprising a use arrangement. As an illustrative example, as illustrated in FIGS. 12A, 12B and 13A, in one implementation, the first configuration may comprise rolling the base panel 202 into a roll shape (e.g., or folding into a folded shape), as in FIGS. 12A and 12B. Further, in this implementation, the second configuration may comprise spreading the base panel 202 out to a flat-configuration so that it may be used, such as for providing lighting for an image capture event.

Figure 5A:
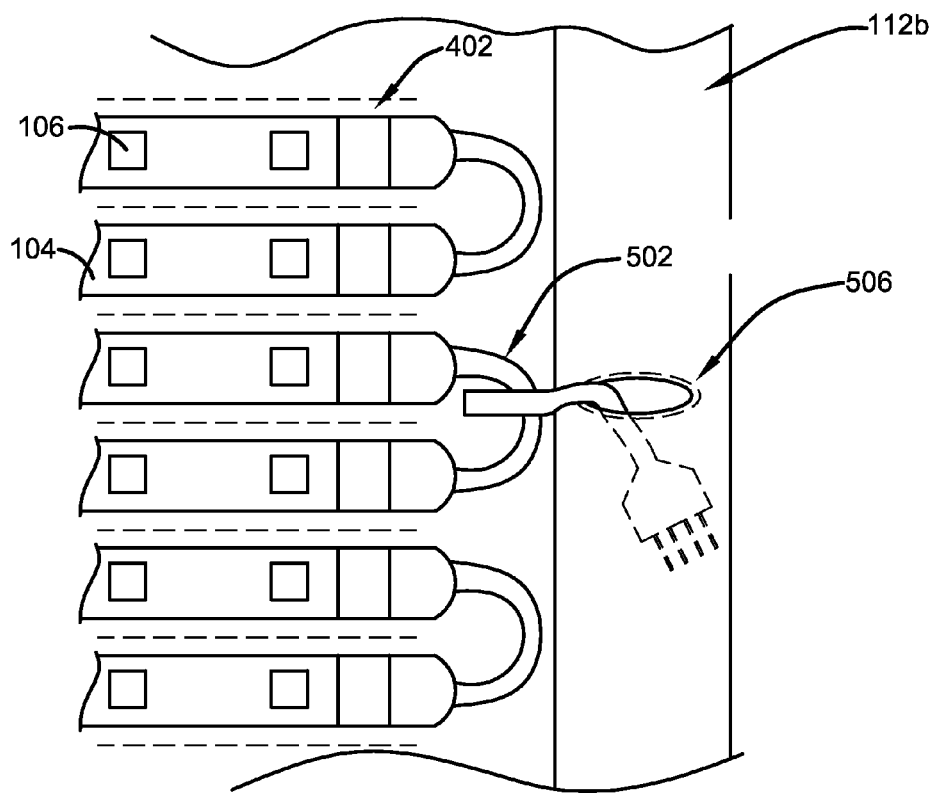
FIGS. 5A, 5B and 5C are component diagrams illustrating example implementations of one or more portions of an exemplary lighting panel.

In one implementation, as illustrated in FIG. 5A, the respective pockets 402 can be disposed in a same orientation, such that corresponding LED strips 104 may also be disposed in a same direction. In this way, for example, the orientation may facilitate arranging the professional grade lighting apparatus in a compact arrangement (e.g., rolled up). In one implementation, the respective pockets 402 can be arranged in a manner that facilitates folding the professional grade lighting apparatus 100 in a desired compact arrangement (e.g., folding), such that the LED strips 104 disposed in the pockets 402 are likewise arranged in a manner that facilitates folding the professional grade lighting apparatus 100 in a desired compact arrangement. This folding may occur at later to be described hinges that permit relative pivotal motion.

As illustrated in FIGS. 1A, 1B, 2-4, 7A and 7B, the exemplary professional grade lighting apparatus 100 comprises a holding panel 102 that is operably engaged with the base panel 202. The holding panel 102 can comprise a plurality of pockets 402, where the respective pockets may be configured to receive at least one LED strip 104. The light element holding panel 102 can comprise a flexible transparent material, and/or a flexible translucent material.

In one implementation, the holding panel 102 may be operably engaged with the base panel 202 using a fastening means. As one example, the holding panel 102 may be sewn (e.g., or glued, fastened, integrally formed with, etc.) onto the base panel 202. As an illustrative example, as illustrated in FIGS. 4, 7A and 7B, with reference to FIGS. 1-3, the pockets 402 may be formed in the holding panel 102 by fastening the flexible material 702 of the holding panel 102 to the base panel 202 at one or more desired attachment locations 406. For example, the flexible material 702 of the holding panel 102 can be sewn (e.g., or fastened) to the base panel 202 at the one or more desired attachment locations 406, thereby forming the respective pockets in the portions of the flexible material 702 not sewn to the base panel 202. A pocket 402 as used in this patent is defined as a space that is: (1) between juxtaposed attachment locations 406; and, (2) between the base panel 202 and the holding panel 102. Each attachment location 406 may define a hinge that permits relative pivotal motion.

Figure 3:
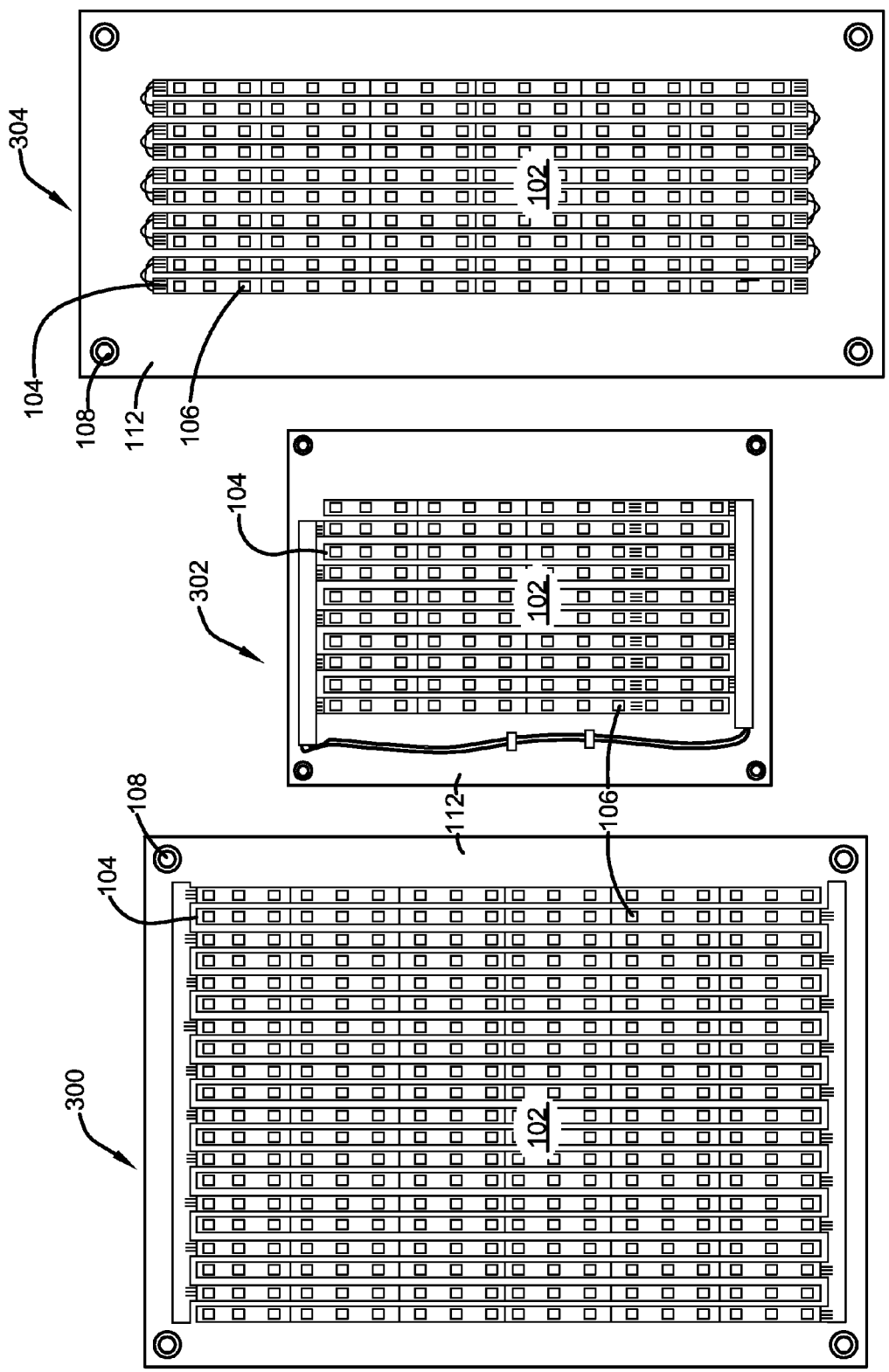
FIG. 3 is a component diagram illustrating example implementations of one or more portions of an exemplary lighting panel.
Figure 4:
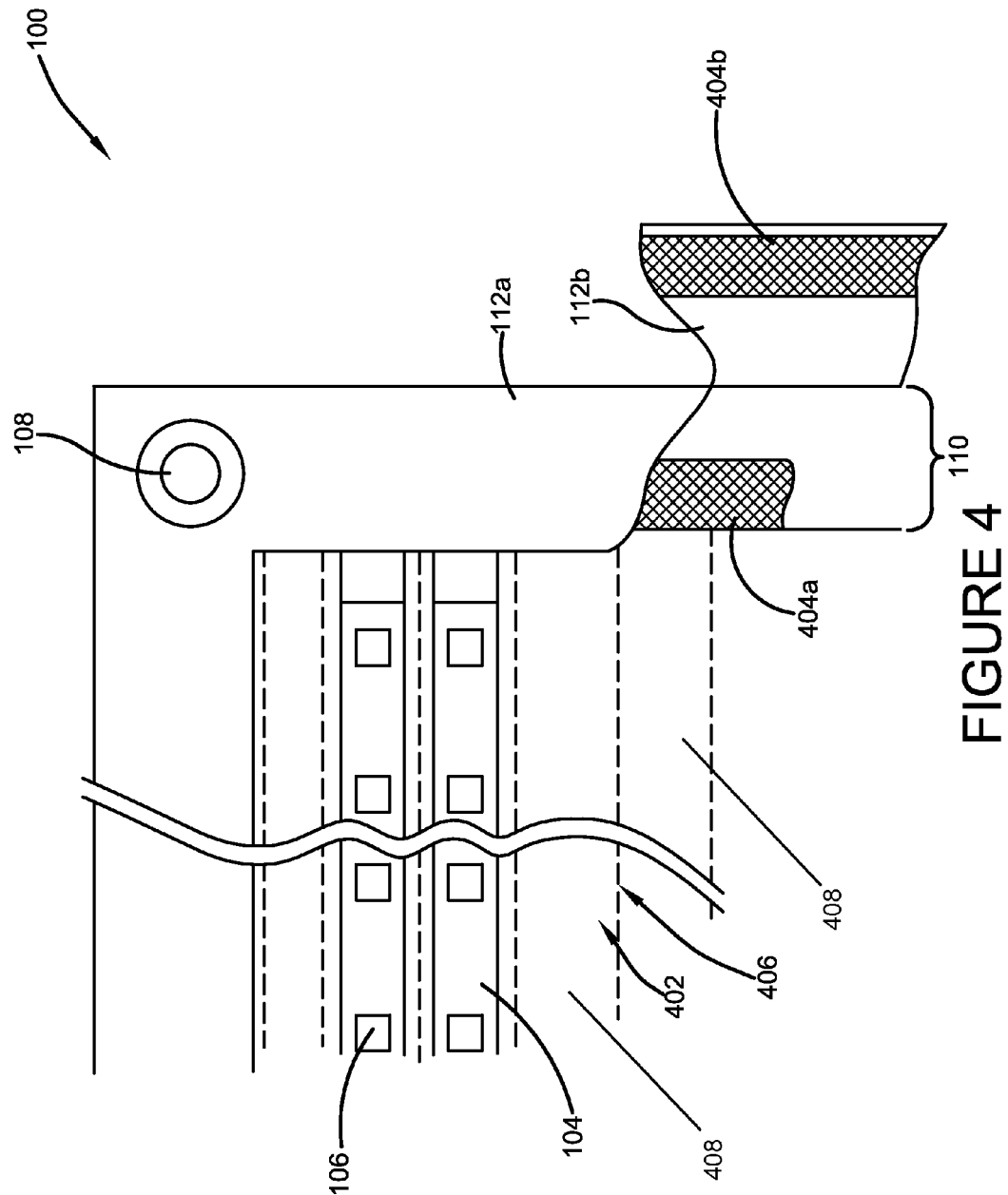
FIG. 4 is a component diagram illustrating an example implementation of one or more portions of an exemplary lighting panel.

As illustrated in FIG. 3, the professional grade lighting apparatus 100 may be configured in various shapes and sizes 300, 302, 304. As an example, a size and/or shape of the exemplary lighting panel can be determined by an intended use, such as determined by the target lighting subject, lighting area, and/or available area for an imaging project. For example, the lighting panel 304 comprises a larger area that may provide more lighting than example panel 302 or 304. As another example, the configurations of panels 302 and 304 may be utilized in areas having specialized arrangements and/or smaller subjects.

The professional grade lighting apparatus 100 can comprise a plurality of LED strips 104. Respective LED strips 104 can be disposed in a pocket 402 of the holding panel 102. Further, LED strips 104 can comprise one or more light emitting semiconductors 106 that are configured to produce white light. As an example, a light emitting semiconductor can comprise electrical circuitry that emits light when an electrical current is passed across a semi-conductor portion of the circuitry as electrons in the semi-conductor material recombine with electron holes to release photons.

In one implementation, the light emitting semiconductor may comprise a light emitting diode (LED). In one implementation, the light emitting semiconductor may comprise an organic light-emitting diode (OLED). In another implementation, the light emitting semiconductor may comprise a polymer light-emitting diode (PLED), or a light-emitting polymer (LEP), which can utilize an electroluminescent conductive polymer that emits photons when subjected to an electrical current. In another implementation, the light emitting semiconductor may comprise a light-emitting electrochemical cell (LEC), which can generate light using electroluminescence. In one implementation, the LED strips 104 are commercially available strips cut to the appropriate length to fit into a pocket 402. Each LED strip may include (1) first and second opposite ends; (2) electrical circuitry; (3) electric wiring that extends from each end; (4) a first side from which LED light is emitted; and, (5) a second side opposite the first side. Each LED strip 104 may be placed onto the reflector surface 408 of the base panel 202.

In one implementation, as illustrated in FIGS. 1-6, respective LED strips may comprise a plurality of light emitting semiconductors 106. As one example, in FIG. 5C, an example LED strips 104 may comprise a strip arrangement, comprising a plurality of light emitting semiconductors 106 (e.g., LEDs), appropriate circuitry 516 configured to facilitate operation of the LED strips 104, and corresponding electrical connection 512, 514 for providing electrical connection to respective LED strips 104.

Figure 5B:
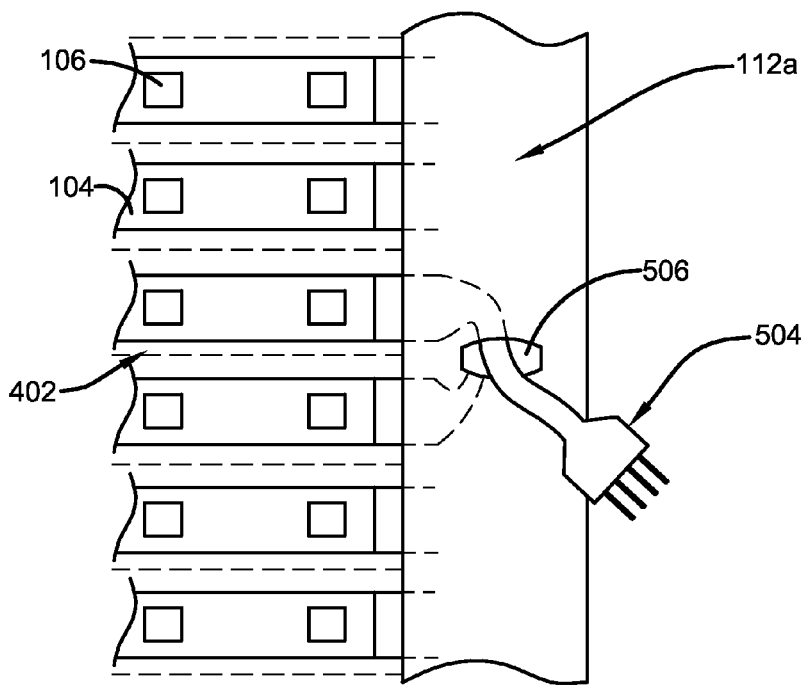
Figure 5C:
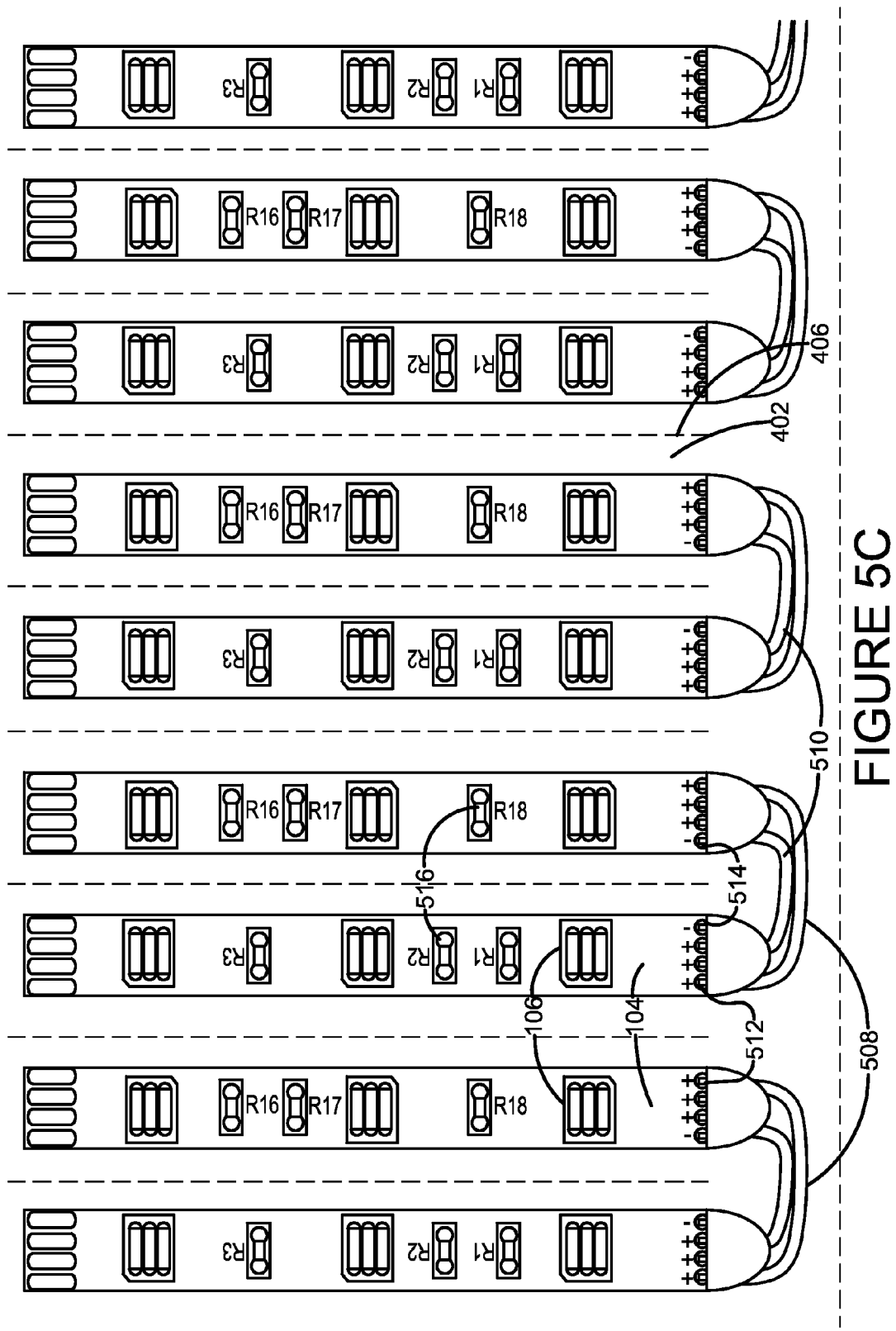
Figure 6:
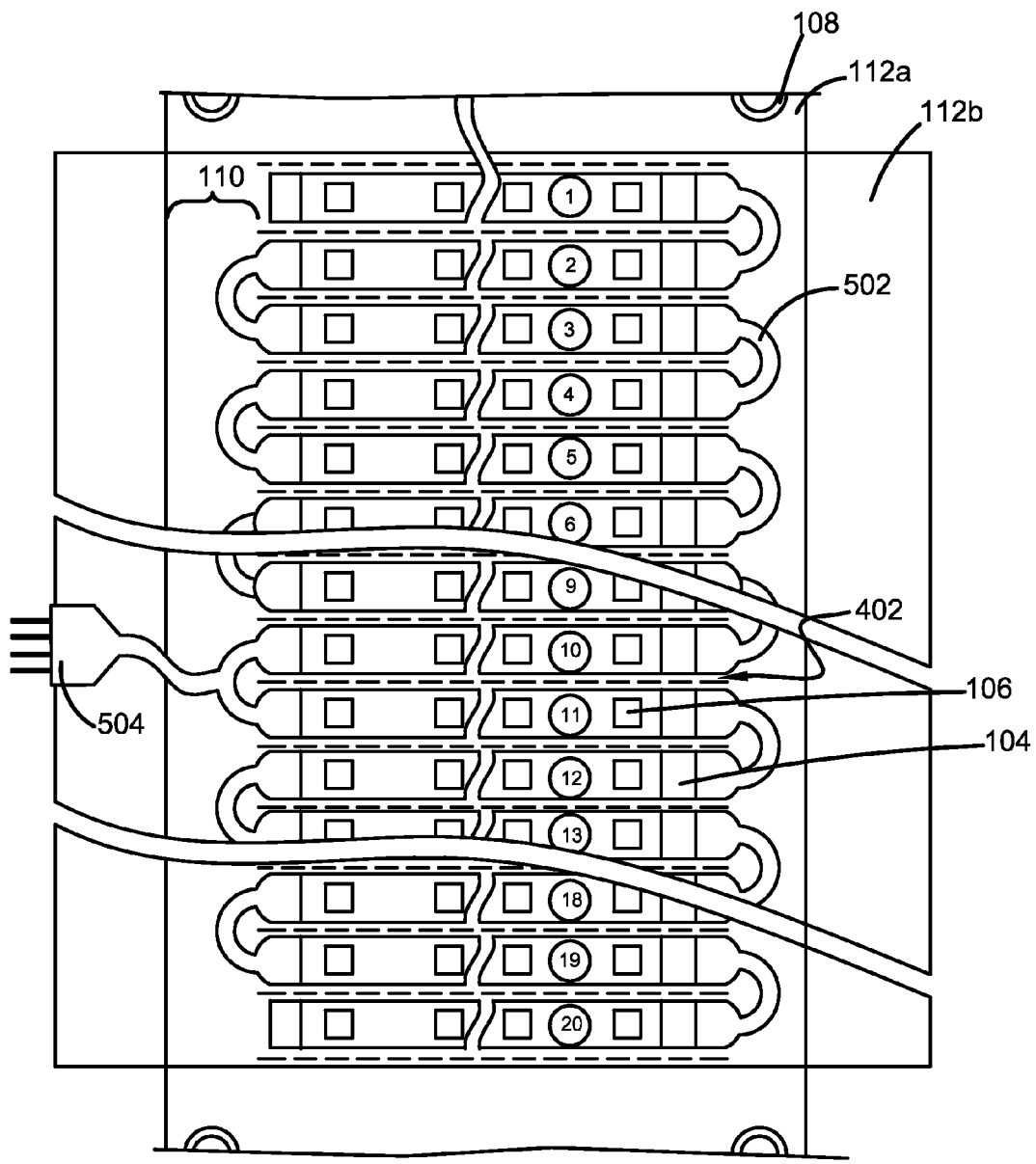
FIG. 6 is a component diagram illustrating an example implementation of one or more portions of an exemplary lighting panel.

In one implementation, the plurality of LED strips can be electrically coupled together in a serial configuration, as illustrated in FIGS. 5A, 5C, and 6. As an example, in FIG. 5C, respective LED strips 104 can comprise one or more positive connection terminals 512 and one or more negative connection terminals 514. In this example, when two or more lighting elements are electrically coupled in series, adjacent positive connection terminals 512 may be coupled by a positive coupling wire 508, and adjacent negative connection terminals 514 may be coupled by a negative coupling wire 510.

Further, as illustrated in FIGS. 5A and 6, adjacent LED strips 104 may be electrically coupled by an element coupler 502, for example, which may comprise one or more positive coupling wires 508 and one or more negative coupling wires 510. In this example, a first element coupler 502 can couple a first lighting element and a second lighting element at a first end; and a second element coupler 502 can couple the second lighting element and a third lighting element at a second end, and so-on.

Figure 8B:
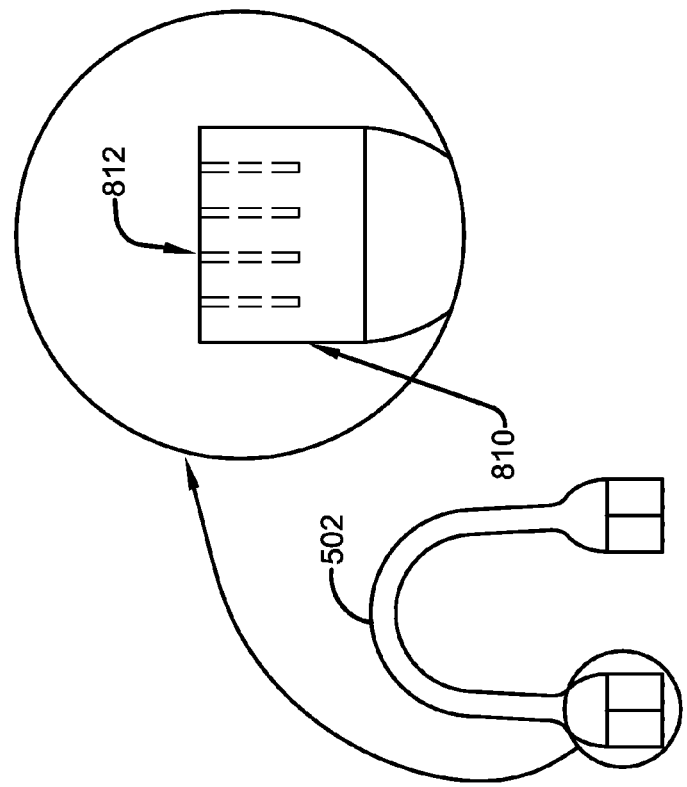
FIGS. 8A and 8B are component diagrams illustrating an example implementation of one or more portions of an exemplary lighting panel.
Figure 8A:
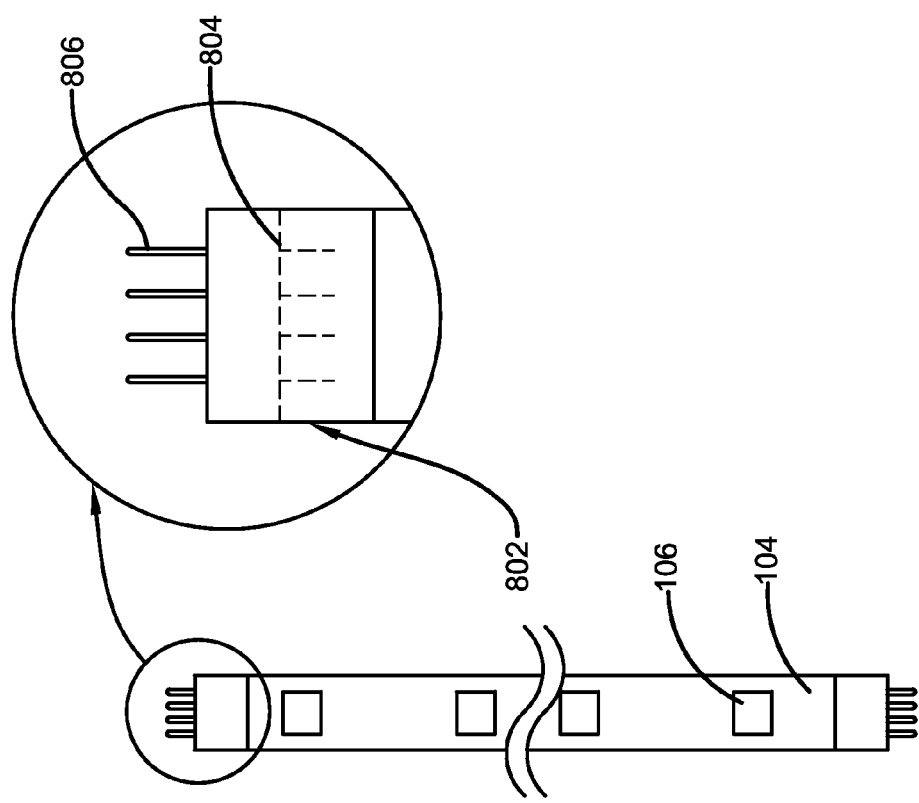
Figure 9:
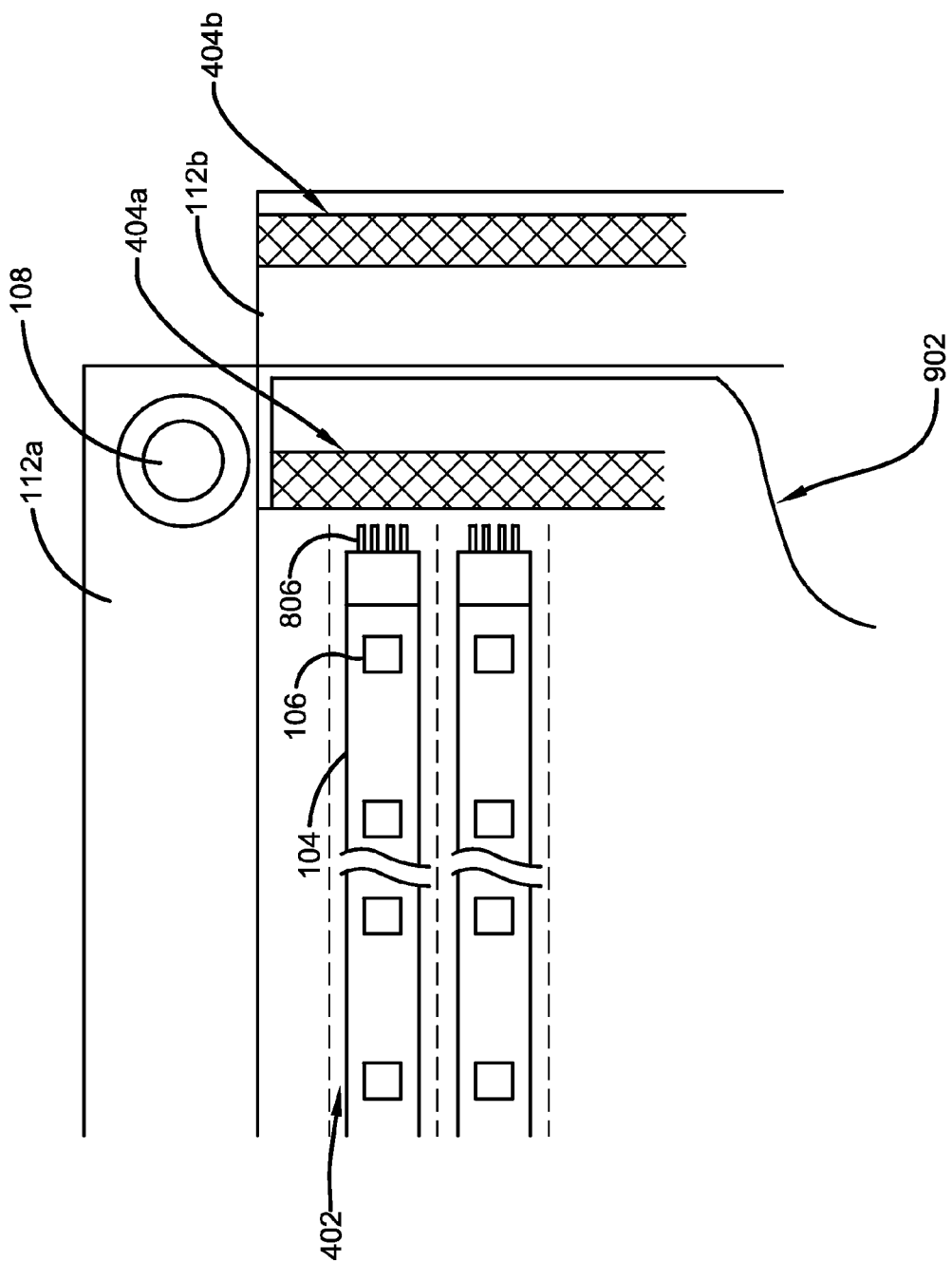
FIG. 9 is a component diagram illustrating an example implementation of one or more portions of an exemplary lighting panel.

As an illustrative example, in FIGS. 8A, 8B, and 9 the element coupler 502 may comprise an element connector 810. In one implementation, the element connector 810 may be configured to selectively connect to a corresponding connection end 804 of LED strips 104. For example, the element connector 810 may comprise female-type connection receptacles 812 that are configured to receive male-type connector pins 806 disposed on the connection end 804 of LED strips 104. In this way, for example, the element coupler 502 may be used to connect respective LED strips 104, such as in series. Further, as illustrated in FIGS. 5B, 6, and 11, the series of electrical connections may be electrically couples with an electrical supply connector 504, for example, configured to be connected to an electrical supply (e.g., a battery, electrical receptacle, etc.), such as through an electrical power supply line.

Figure 11:
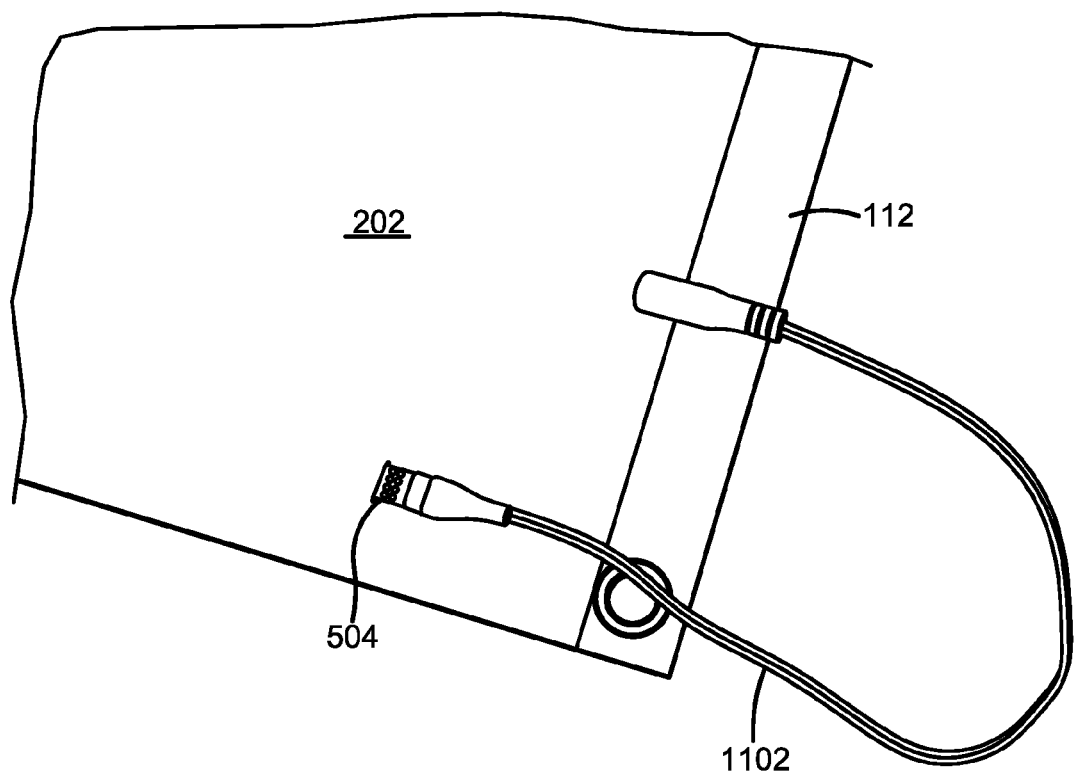
FIG. 11 is a component diagram illustrating a rear view of an example implementation of one or more portions of an exemplary lighting panel.
Figure 13B:
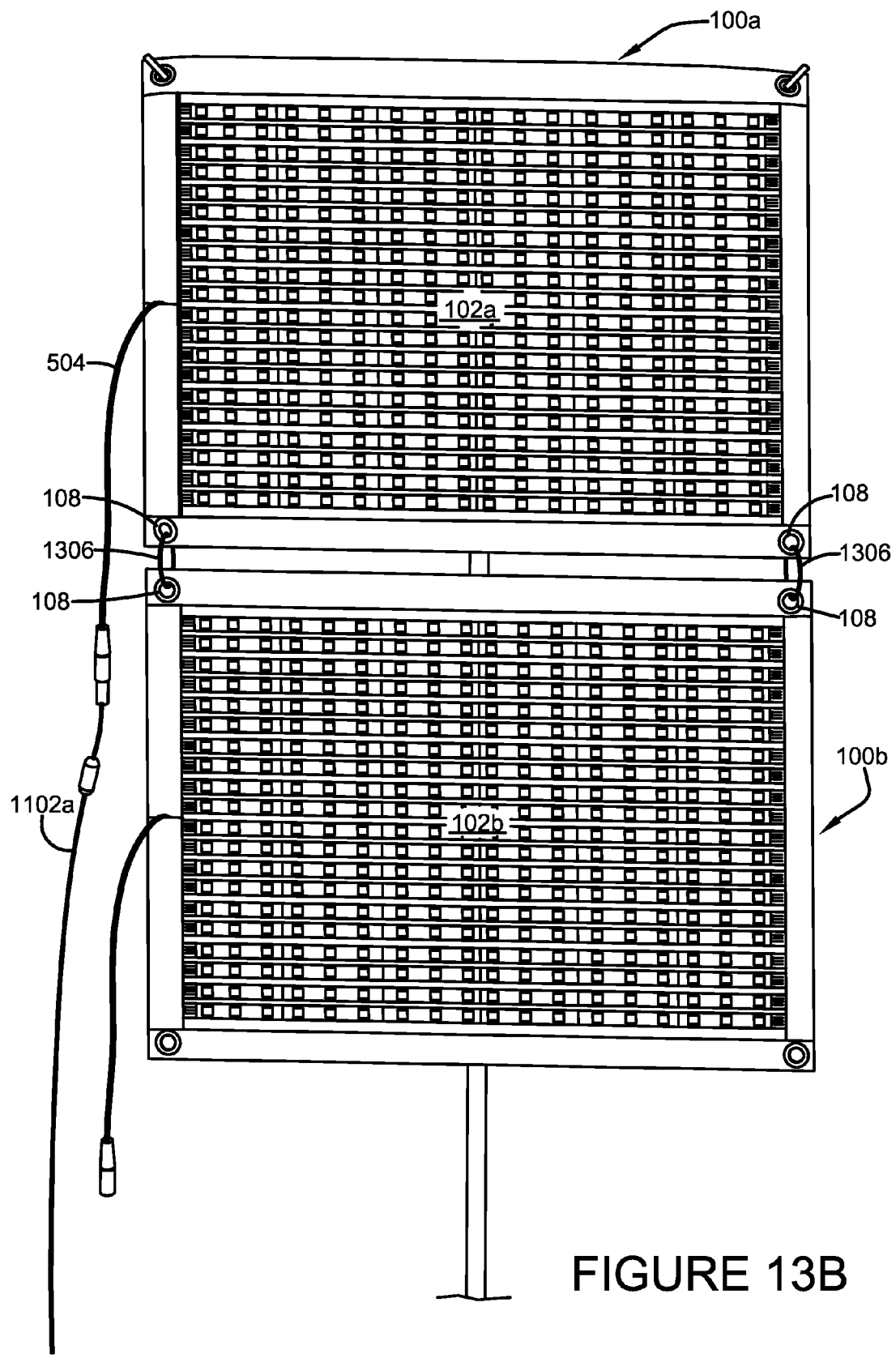

In one implementation, as illustrated in FIG. 11, the electrical supply connector 504 may be selectively coupled to an electrical power supply line extension 1102, which can be configured to selectively connect to an electrical supply line. For example, the supply connector 504 may be disposed adjacent to the exemplary panel, and comprise a male or female connector that is configured to selectively engage with a corresponding male or female connector of the electrical power supply line extension 1102. In this way, for example, the professional grade lighting apparatus 100 may be more easily arranged into the compact arrangement (e.g., as in FIG. 12B). In one implementation, as illustrated in FIG. 13B, the first professional grade lighting apparatus 100a may comprise a first electrical power supply line extension 1102a, and the second professional grade lighting apparatus 100a may comprise a first electrical power supply line extension (not shown), where the respective electrical power supply line extensions can be configured to be selectively coupled with an electrical power supply (e.g., combined or singly).

Figure 10:
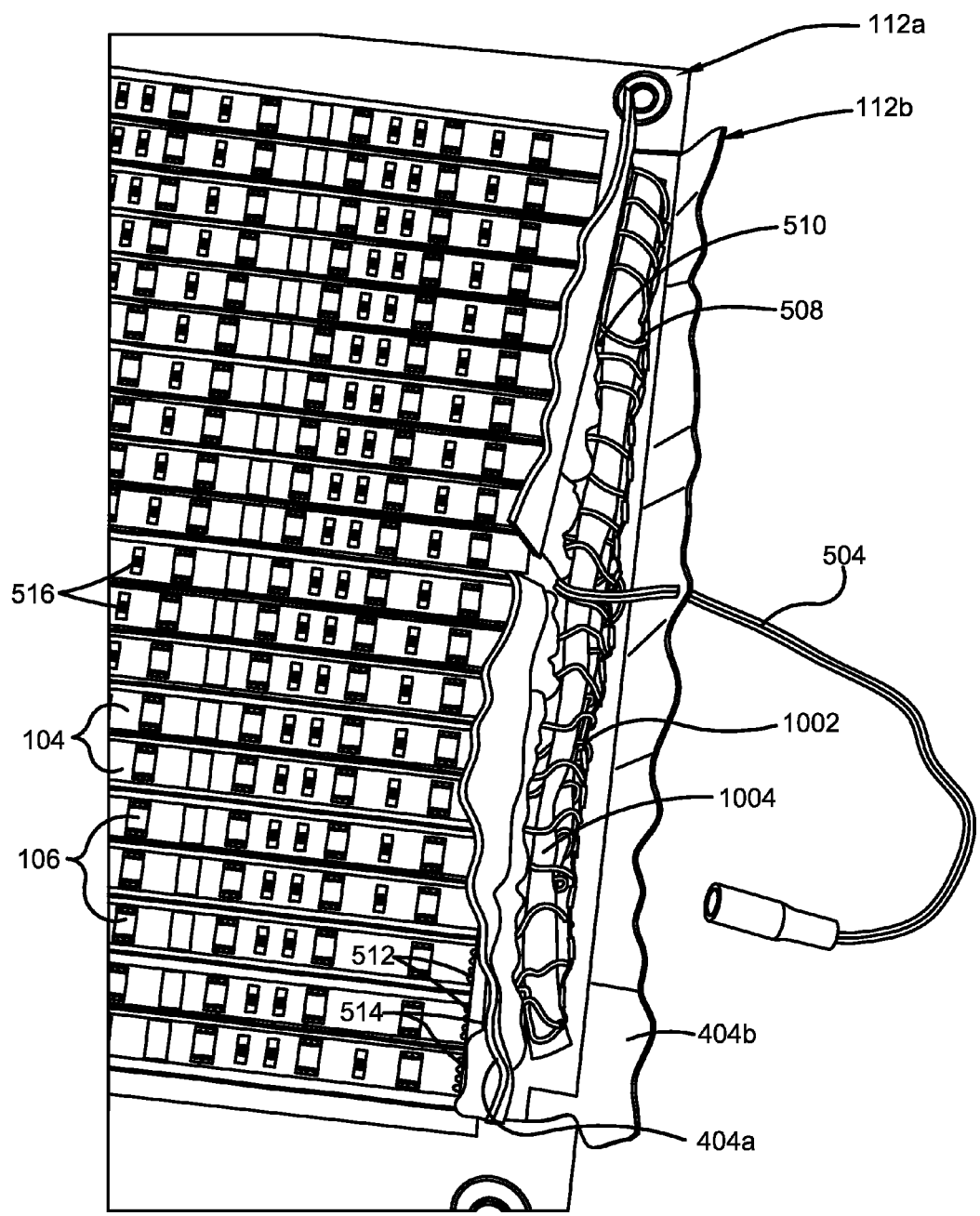
FIG. 10 is a component diagram illustrating an example implementation of one or more portions of an exemplary lighting panel.

In another implementation, the respective LED strips 104 may be electrically coupled in parallel. As an illustrative example, in FIG. 10, respective positive coupling wires 508 may be coupled with a common positive wire 1002; and respective negative coupling wires 510 may be coupled with a common negative wire 1004. Further, in this example, the common positive wire 1002 and common negative wire 1004 may be coupled with an electrical supply connector 504. In one implementation, the respective positive coupling wires 508 may be configured to be selectively coupled and/or uncoupled with the common positive wire 1002; and the respective negative coupling wires 510 may be configured to be selectively coupled and/or uncoupled with the common negative wire 1004, such as by using an electrical connector and receptacle (e.g., such as 804 and 810 of FIGS. 8A and 8B).

In one implementation, LED strips 104 may be selectively removable from, and/or replaceable in, opposite open ends of a pocket 402; and/or the wiring that electrically couples the respective LED strips 104 may be selectively accessed for service. For example, as illustrated in FIGS. 1A, 1B, 3, 4, 5A and 5B, the professional grade lighting apparatus 100 may comprise an enclosing edge 112 that may be configured to enclose the edge of the holding panel 102 and base panel 202. For example, as illustrated in FIGS. 1B, 4, 5A, 5B, and 9, the enclosing edge 112 may comprise a top side 112a and a bottom side 112b. In one implementation, the bottom side 112b may comprise a first part 404b of a fastener (e.g., a hook and loop fastener), that is configured to selectively engage a second part 404a of the fastener engaged with the base panel 202.

In this way, for example, the enclosing edge 112 may be selectively opened and/or closed to access or enclose the underlying electrical connections, and/or openings to the respective pocket 402. As an example, if a lighting element 104 becomes disabled, the enclosing edge 112 may be opened, an electrical coupler 502 can be uncoupled from the disabled LED strips 104, and the LED strips 104 may be removed from the corresponding pocket 402. Further, in this example, LED strips 104 may be inserted into the empty pocket 402, and recoupled to the electrical coupler 502. The enclosing edge 112 may be subsequently closed, for example, to mitigate exposure of the electrical connections to potential damage.

In one implementation, as illustrated in FIGS. 13A and 13B, the base panel 202 can comprise one or more mounting means 108 that are configured to selectively engage with a lighting apparatus holding device 1302. For example, the lighting apparatus holding device 1302 may comprise rods (e.g., flexible rods), comprising an engagement end that can selectively engage with the mounting means 108, such as by inserting the engagement end into a through hole disposed in the base panel 202. Further, as an example, the flexible rods may be mounted to a stand 1304 that allows the professional grade lighting apparatus 100 to be elevated or disposed in a desired location. For example, the lighting apparatus holding device 1302 can effectively spread the exemplary panel out into a desired use configuration, such that the respective LED strips 104 are directed toward a desired subject (e.g., for image capture).

In one implementation, the mounting means 108 may be configured to couple a first professional grade lighting apparatus 100a to a second professional grade lighting apparatus 100b, as illustrated in FIG. 13B. In this example, fastening means 1306 (e.g., hook, loop, ring, carabiner, tie, etc.) may be selectively engaged with the mounting means 108 of the first professional grade lighting apparatus 100a, and mounting means 108 of the second professional grade lighting apparatus 100b to couple them together. In this way, for example, the combined professional grade lighting apparatus 100a, 100b may provide increased lighting, and/or a desired arrangement of lighting, for a desired imaging subject.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A professional grade lighting apparatus for use with an associated electrical supply, the professional grade lighting apparatus comprising:
   a base panel that is flexible and comprises a reflector surface;
   a holding panel that is flexible and formed of a transparent and/or translucent material;

a plurality of commercially available LED strips each comprising: (1) first and second opposite ends; (2) electrical circuitry; (3) electric wiring that extends from each end; (4) a first side from which LED light is emitted; and, (5) a second side opposite the first side;

an electric supply connector that electrically connects to the associated electrical supply and to the electric wiring of the LED strips;

wherein the base panel is fixed to the holding panel at a plurality of attachment locations that define hinges permitting relative pivotal motion;

wherein pockets are defined as spaces that are: (1) between juxtaposed attachment locations; and, (2) between the base panel and the holding panel;

wherein each pocket has opposite open ends;

wherein each LED strip is positioned within a pocket with: (1) the electric wiring at each end accessible through the corresponding pocket open end; (2) the first side in physical contact with the holding panel; and, (3) the second side in physical contact with the reflector surface of the base panel;

wherein the electric wiring at the first ends of the LED strips are electrically interconnected;

wherein the electric wiring at the second ends of the LED strips are electrically interconnected;

wherein the electric supply connector supplies power from the associated electrical supply to illuminate the LED strips within the pockets to emit the LED light through the holding panel at sufficient lumens for use as a professional grade photographic lighting panel;

wherein each LED strip is designed to be selectively independently removable from its electric wiring and from at least one of its corresponding pocket open ends;

wherein juxtaposed pockets, and thus juxtaposed LED strips, are pivotal relative to each other about their neighboring hinge; and, wherein the professional grade lighting apparatus is designed to be adjusted between: (1) a first configuration comprising a rolled-up panel configuration; and, (2) a second configuration comprising a flat configuration.

2. The professional grade lighting apparatus of claim 1 wherein:
the base panel comprises one or more mounting means designed to selectively engage with a lighting apparatus holding device.

3. The professional grade lighting apparatus of claim 2 wherein:
the mounting means is designed to couple a first professional grade lighting apparatus to a second professional grade lighting apparatus.

4. The professional grade lighting apparatus of claim 1 wherein:
the pockets have longitudinal axes that are parallel.

5. The professional grade lighting apparatus of claim 1 wherein:
each pocket is sized and shaped to receive only one LED strip.

6. The professional grade lighting apparatus of claim 1 wherein:
each pocket is sized and shaped to alternatively receive each LED strip.

7. The professional grade lighting apparatus of claim 1 wherein:
the base panel is sewed to the holding panel at each of the plurality of attachment locations.

8. The professional grade lighting apparatus of claim 1 wherein:
each attachment location falls on a straight line.

9. The professional grade lighting apparatus of claim 1 further comprising:
first and second enclosing ends that are operable to enclose the open ends of the pockets.

10. The professional grade lighting apparatus of claim 9 wherein:
the first and second enclosing ends comprise hook and loop fasteners.

11. The professional grade lighting apparatus of claim 1 wherein:
when the lighting apparatus is in the flat configuration, a portion of the holding panel forming each pocket is U-shaped.

12. A method of assembling a professional grade lighting apparatus that can be used with an associated electrical supply, the method comprising the steps of:
(A) providing a base panel that is flexible and comprises a reflector surface;
(B) providing a holding panel that is flexible and formed of a transparent and/or translucent material;
(C) providing a plurality of commercially available LED strips each comprising: (1) first and second opposite ends; (2) electrical circuitry; (3) electric wiring that extends from each end; (4) a first side from which LED light is emitted; and, (5) a second side opposite the first side;
(D) providing an electric supply connector;
(E) fixing the base panel to the holding panel at a plurality of attachment locations that define hinges permitting relative pivotal motion;
(F) defining pockets as spaces that: (1) are between juxtaposed attachment locations; (2) are between the base panel and the holding panel; and, (3) have opposite open ends;
(G) positioning each LED strip within a pocket with: (1) the electric wiring at each end accessible through the corresponding pocket open end; (2) the first side in physical contact with the holding panel; (3) the second side in physical contact with the reflector surface of the base panel; (4) the electric wiring at the first ends of the LED strips electrically interconnected; and, (5) the electric wiring at the second ends of the LED strips electrically interconnected;
wherein the professional grade lighting apparatus is designed, when assembled, to perform the following steps:
(H) electrically connecting the electric supply connector to the associated electrical supply and to the electric wiring of the LED strips to power the LED strips to provide professional grade photographic lighting;
(I) selectively independently removing each LED strip from its electric wiring and from at least one of its corresponding pocket open end;
(J) pivoting juxtaposed pockets, and thus juxtaposed LED strips, relative to each other about their neighboring hinge; and,
(K) adjusting the professional grade lighting apparatus between: (1) a first configuration comprising a rolled-up panel configuration; and, (2) a second configuration comprising a flat configuration.

13. The method of claim 12 further comprising the step of:
providing the base panel with one or more mounting means designed to selectively engage with a lighting apparatus holding device.

14. The method of claim 13 wherein:
the mounting means is designed to couple a first professional grade lighting apparatus to a second professional grade lighting apparatus.

15. The method of claim 12 wherein:
each pocket is sized and shaped to receive only one LED strip.

16. The method of claim 12 wherein:
each pocket is sized and shaped to alternatively receive each LED strip.

17. The method of claim 12 wherein step (E) comprising the step of:
sewing the base panel to the holding panel at each of the plurality of attachment locations.

18. The method of claim 12 further providing the step of:
first and second enclosing ends that are operable to enclose the open ends of the pockets.

19. The method of claim 18 wherein:
the first and second enclosing ends comprise hook and loop fasteners used to enclose the open ends of the pockets.

20. The method of claim 12 wherein:
when the lighting apparatus is in the flat configuration, a portion of the holding panel forming each pocket is U-shaped.

\* \* \* \* \*